US011573310B2

(12) United States Patent
Arkind et al.

(10) Patent No.: US 11,573,310 B2
(45) Date of Patent: Feb. 7, 2023

(54) COMPACT RADAR SWITCH/MIMO ARRAY ANTENNA WITH HIGH AZIMUTH AND ELEVATION ANGULAR RESOLUTION

(71) Applicant: ARBE ROBOTICS LTD., Tel Aviv (IL)

(72) Inventors: Noam Arkind, Givatayim (IL); Amos Baron, Petach Tikva (IL); Yoram Stettiner, Hod Hasharon (IL)

(73) Assignee: Arbe Robotics Ltd.

( * ) Notice: Subject to any disclaimer, the term of this patent is extended or adjusted under 35 U.S.C. 154(b) by 446 days.

(21) Appl. No.: 16/480,030

(22) PCT Filed: Jan. 30, 2018

(86) PCT No.: PCT/IL2018/050104
§ 371 (c)(1),
(2) Date: Jul. 23, 2019

(87) PCT Pub. No.: WO2018/142396
PCT Pub. Date: Aug. 9, 2018

(65) Prior Publication Data
US 2020/0003884 A1    Jan. 2, 2020

(30) Foreign Application Priority Data

Jan. 31, 2017   (IL) .......................................... 250381

(51) Int. Cl.
*G01S 13/34*    (2006.01)
*G01S 13/10*    (2006.01)
(Continued)

(52) U.S. Cl.
CPC ............ *G01S 13/34* (2013.01); *G01S 13/106* (2013.01); *G01S 13/42* (2013.01); *G01S 13/931* (2013.01);
(Continued)

(58) Field of Classification Search
CPC ....... H04B 7/0413; G01S 7/03; G01S 7/2813; G01S 13/003; G01S 13/106; G01S 13/42;
(Continued)

(56) References Cited

U.S. PATENT DOCUMENTS 9,557,585 B1 * 1/2017 Yap ..................... H01L 23/5226
2008/0258964 A1   10/2008 Schoeberl et al.
(Continued)

FOREIGN PATENT DOCUMENTS

CN        102866401 B  *  3/2014
DE    102004059915 A1     6/2006
(Continued)

OTHER PUBLICATIONS

Prechtel et al., "Short-range MIMO radar system considerations" 2012 6th European Conference on antennas and propagation (EUCAP) Mar. 1, 2012 (4 pages).
(Continued)

*Primary Examiner* — Donald H B Braswell
(74) *Attorney, Agent, or Firm* — Zaretsky Group PC; Howard Zaretsky

(57) ABSTRACT

A method for increasing the effective aperture of radar switch/MIMO antenna array, using a low number of transmit (Tx) and receive (Rx) army elements, according to which an array of radar physical receive (Rx)/Transmit (Tx) elements are arranged in at least two opposing Rx rows and at least two opposing Tx columns, such that each row includes a plurality of receive (Rx) elements uniformly spaced from each other and each column includes a plurality of transmit (Tx) elements uniformly spaced from each other, the array forming a rectangular physical aperture. Used as a switch array, a first Tx element from one column is activated to transmit a radar pulse during a predetermined time slot. Reflections of the first transmission are received in all Rx
(Continued)

elements, thereby virtually replicating the two opposing Rx rows about an origin determined by the location of the first Tx element within the rectangular physical aperture. This process is repeated for all remaining Tx elements during different time slots, thereby virtually replicating the two opposing Rx rows about an origin determined by the location of each activated Tx element within the rectangular physical aperture, while each time, receiving reflections of the transmission from each Tx element in all Rx elements. This way, a rectangular virtual aperture having dimensions which are twice the dimensions of the rectangular physical aperture is paved with replicated two opposing Rx rows. This virtual aperture determines the radar beam widths and side-lobes.

18 Claims, 3 Drawing Sheets

(51) Int. Cl.
   *G01S 13/42* (2006.01)
   *G01S 13/931* (2020.01)
   *H01Q 1/32* (2006.01)
   *H01Q 21/08* (2006.01)
   *H04B 7/0413* (2017.01)

(52) U.S. Cl.
   CPC ........... *H01Q 1/3233* (2013.01); *H01Q 21/08* (2013.01); *H04B 7/0413* (2013.01)

(58) Field of Classification Search
   CPC ....... G01S 13/931; G01S 13/34; H01Q 21/28; H01Q 1/3233; H01Q 21/08
   See application file for complete search history.

(56) References Cited

U.S. PATENT DOCUMENTS

| | | | |
|---|---|---|---|
| 2010/0141508 A1* | 6/2010 | Nguyen | G01S 13/9089 342/159 |
| 2011/0279669 A1 | 11/2011 | Longstaff | |
| 2015/0323650 A1* | 11/2015 | Schuman | H04K 3/228 342/17 |
| 2016/0365631 A1 | 12/2016 | Huang et al. | |
| 2018/0149736 A1* | 5/2018 | Alland | H01Q 21/28 |
| 2018/0166794 A1* | 6/2018 | Raphaeli | G01S 13/06 |
| 2019/0339382 A1* | 11/2019 | Hess | G01S 7/04 |

FOREIGN PATENT DOCUMENTS

| | | | |
|---|---|---|---|
| DE | 102011083756 A1 | 4/2013 | |
| EP | 3244231 A1 * | 11/2017 | ............ G01S 13/87 |
| WO | 2015075072 A1 | 5/2015 | |

OTHER PUBLICATIONS

Supplementary European Search Report for European application nuber EP 18 74 7141; dated Nov. 13, 2020 (11 pages).
International Search Report for PCT/IL2018/050104, dated May 14, 2018 (3 pages).
Written Opinion of the International Searching Authority for PCT/IL2018/050104, dated May 14, 2018 (4 pages).

* cited by examiner

COMPACT RADAR SWITCH/MIMO ARRAY ANTENNA WITH HIGH AZIMUTH AND ELEVATION ANGULAR RESOLUTION

FIELD OF THE INVENTION

The present invention relates to the field of imaging radars. More particularly, the invention relates to a compact radar switch array antenna with high azimuth and elevation angular resolution, and increased effective aperture.

BACKGROUND OF THE INVENTION

In recent years many industries are moving to autonomous solutions such as the automotive industry, deliveries etc. These autonomous platforms should operate in the environment while interacting with both the stationary and moving objects. For this purpose these systems require a sensor suite which allows them to sense their surrounding in a reliable and efficient manner. For example, in order for an autonomous car to plan its route on a road with other cars on it, the trajectory planner must have a 3D map of the environment with indication of moving objects. Visual sensors are also degraded by bad weather and poor visibility (e.g. fog, smoke, sand, storm etc.). They are also limited in estimating radial velocities. Light Detection And Ranging devices (LIDARs—used to measure distance to a target by illuminating that target with a laser light) are expensive, most have moving parts and very limited range. Radar is an augmenting (not replacing) technology.

Due to natural limitations of visual sensors in range accuracy and reliability problems with optical (laser) technologies, the best solution to generate this 3D map is via a radar technology. This imposes a new set of requirements which modern radars does not comply with.

Generally, larger aperture of the receiving antenna allows receiving more radiation and provides larger sensitivity, or equivalently, allowing a narrower main lobe. Hence, the receiving antenna can receive weaker signals and provide a relatively accurate indication regarding their direction.

On the other hand, vehicular radars (including automotive imaging radars) require less sensitivity (since the range is relatively short and the signals that are reflected from a target are relatively strong). However, vehicular radars are not required to detect point targets (such as an aircraft of a missile) but do require high accuracy, in order to provide an image of the environment information which is used an input to a Simultaneous Localization And Mapping (SLAM) algorithm which should detect the location of obstacles, such as other cars or pedestrians in the close vicinity. A narrow lobe with high accuracy will be able to provide sharper contour lines of the target image. The lobe width is determined solely by the equivalent aperture, normalized to the wavelength of the transmitted radar signal (and not by the number of receiving antenna elements within the aperture, which affects the sensitivity, i.e., the ability to detect weak reflected signals, and ambiguity resolution and the side lobes level).

Another critical performance parameter of imaging radars is the antenna array's side lobes level. In case when there is a large object (such as a wall) located in a direction of a side lobe, an attenuated version reflections from said object appears to be in the direction of the main lobe, and may mask reflections that originate from an obstacle, such as a pedestrian, or create a phantom obstacle which may cause the vehicle to stop. Therefore, in automotive imaging radars, it is critical to reduce the side lobes as much as possible.

It is therefore an object of the present invention to provide a compact radar switch array antenna with high azimuth and elevation angular accuracy (resolution), and increased effective aperture, while using a low number of transmit (Tx) and receive (Rx) elements, in order to meet cost, space, power and reliability requirements.

It is another object of the present invention to provide a compact radar antenna array with high azimuth and elevation angular accuracy (resolution), and increased effective aperture, while reducing unwanted side-lobes.

Other objects and advantages of the invention will become apparent as the description proceeds.

SUMMARY OF THE INVENTION

The present invention is directed to a method for increasing the effective aperture of radar switch/MIMO antenna array, using a low number of transmit (Tx) and receive (Rx) array elements, according to which an array of radar physical receive (Rx)/Transmit (Tx) elements are arranged in at least two opposing Rx rows and at least two opposing Tx columns, such that each row includes a plurality of receive (Rx) elements uniformly spaced from each other and each column includes a plurality of transmit (Tx) elements uniformly spaced from each other, the array forming a rectangular physical aperture. Used as a switch array, a first Tx element from one column is activated to transmit a radar pulse during a predetermined time slot. Reflections of the first transmission are received in all Rx elements, thereby virtually replicating the two opposing Rx rows about an origin determined by the location of the first Tx element within the rectangular physical aperture. This process is repeated for all remaining Tx elements during different time slots, thereby virtually replicating the two opposing Rx rows about an origin determined by the location of each activated Tx element within the rectangular physical aperture, while each time, receiving reflections of the transmission from each Tx element in all Rx elements. This way, a rectangular virtual aperture having dimensions which are twice the dimensions of the rectangular physical aperture is paved with replicated two opposing Rx rows. This virtual aperture determines the radar beam widths and sidelobes.

The above replication method works equally well in a MIMO or hybrid switch/MIMO design where some signals are transmitted simultaneously by a plurality of Tx array elements using orthogonal waveforms which are later separated in the receiver.

There are 2 groups of Tx columns, one at each side of the physical aperture. Each group may contain one or more columns, nominally spaced $\lambda/2$.

The separation between the leftmost column of the left group, and the leftmost column of the right group is exactly the spacing between Rx elements times the number of Rx elements.

Likewise, the separation between the bottom row and top row is exactly the spacing between Tx elements times the number of Tx elements.

These two design constraints are crucial for keeping sidelobes low.

In one aspect, the transmitting array elements are activated at different times or simultaneously using orthogonal waveforms.

The data may be collected simultaneously from the set of receiving array elements.

The present invention is also directed to a radar sensor, which comprises:

a) an array of radar physical receive (Rx)/Transmit (Tx) elements, arranged in at least two opposing Rx rows and at least two opposing Tx columns, such that each row includes a plurality of receive (Rx) elements uniformly spaced from each other and each column includes a plurality of transmit (Tx) elements uniformly spaced from each other, the array forming a rectangular physical aperture;
b) a processor being adapted to:
b.1) activate a first Tx element from one column, to transmit a radar pulse during a predetermined time slot and receiving reflections of the first transmission in all Rx elements, thereby virtually replicating the two opposing Rx rows about an origin determined by the location of the first Tx element within the rectangular physical aperture; and
b.2) repeat the preceding step for all remaining Tx elements during different time slots, thereby virtually replicating the two opposing Rx rows about an origin determined by the location of each activated Tx element within the rectangular physical aperture, while each time, receiving reflections of the transmission from each Tx element in all Rx elements, thereby virtually paving with replicated two opposing Rx rows, a rectangular physical aperture having dimensions which are twice the dimensions of the rectangular physical aperture.

The radar frequency may be at least 77 GHz.

The array may comprise parallel rows which are "full" in azimuth and parallel columns which are "thin" in azimuth.

The array may also comprise parallel rows which are "thin" in elevation and parallel columns which are "full" in elevation.

The effective size of the aperture may be increased both in vertical (e.g., upwardly) and horizontal (e.g., rightwardly) direction, by activating all Tx elements, one at a time slot.

DETAILED DESCRIPTION OF PREFERRED EMBODIMENTS

The present invention provides a high resolution compact radar switch array antenna design with high azimuth and elevation angular accuracy and increased effective aperture and reduced unwanted side-lobes, using a low number of transmit (Tx) and receive (Rx) elements.

In order to obtain high resolution a phased array has been designed, based on the MIMO-SAR thin/full approach with Switched or non-switched Antenna Array (SAA). In this type of radar there are several transmitting array elements, which are activated at different times or simultaneously using orthogonal waveforms and a set of receiving array elements from which the data is collected simultaneously. In order to achieve high resolution, the radar should have a large aperture with respect to the carrier signal wave length (for 79 GHz λ=0.4 cm). Moreover, for full 3D sensing the large aperture is necessary in both azimuth and elevation. To obtain the maximal aperture in both directions, while minimizing the amount of elements, and the physical size of the array, a special frame design is proposed, which uses the Tx-Rx duality in the thin/full array design. According to this design, the Rx array is full in azimuth and thin in elevation, and the Tx array is full in elevation and thin in azimuth.

Moreover, the resulting equivalent array aperture (which determine the beam widths and sidelobes attenuation) is about twice the physical dimensions of the array. Using an appropriate signal processing, the resulting aperture is twice that of the actual frame dimensions.

Conventional solutions increase the number of receive (Rx) and transmit (Tx) elements within the physical aperture of the array, and lack the doubling effect described above. For example, a typical array may include columns of 12 Tx elements and rows of 144 Rx elements, yielding an array of 144×12=1728 elements. This drastically increases the cost and reduces the reliability of such an array.

On the other hand, the novel design proposed by the present invention can achieve the same accuracy and sidelobes attenuation with only 48 Rx elements and 36 Tx elements, which gives a total of only 84 elements in the array (about 95% saving), as will be shown later on.

The equivalent aperture is normalized to the wavelength λ of the transmitted radar pulse. Therefore, in order to obtain high resolution, it is preferable to transmit at high frequency. In this case, the radar frequency is about 79 GHz.

Even though the proposed design requires transmitting 36 subsequent or orthogonal radar pulses to obtain a single frame, the saving in the number of elements is dramatic.

Figure 1A:
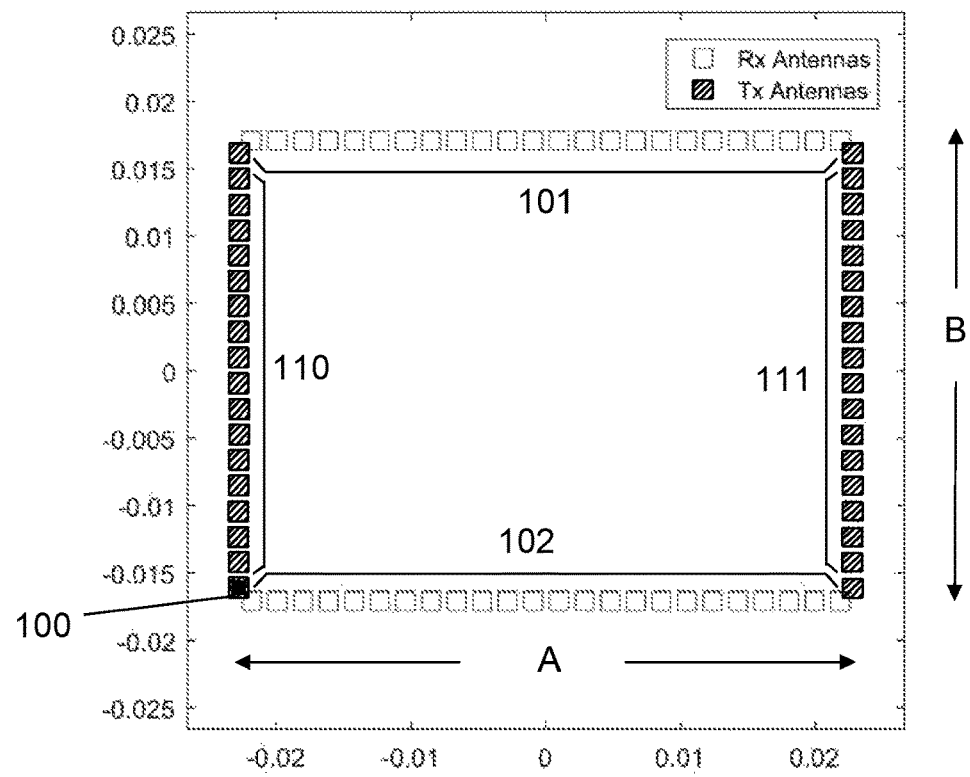
FIGS. 1a-1e show thin/full frame array design for high azimuth and elevation angular resolution, according to the invention.

FIG. 1a illustrates the $1^{st}$ layout of a high resolution physical array with reduced number of elements, according to an embodiment of the invention. The first array proposed by the present invention has two parallel rows 101 and 102 (in the azimuth direction), with 72 receive (Rx) elements in each row (which are nominally spaced about 0.5λ from each other) and two parallel columns 110 and 111, with 6 transmit (Tx) elements in each column (which are spaced exactly 72 times the spacing of the Rx elements=36λ from each other). It can be seen that this is a "thin"/"full" rectangular arrangement (consisting of a full transmit array and thinned receive array, or vice versa), in which the rows are "full" in azimuth (i.e., contain a number of elements Rx with about 0.5λ spacing) and the columns are "thin" in azimuth (i.e., contain a number of elements Tx with 72 times the "full" spacing). For elevation, the roles are reversed, with the columns rows being "full" and the columns are "thin".

In the special case depicted in FIG. 1a, the "thin" size is 2 for both azimuth and elevation, and the equivalent array size is about double the physical size.

The size of the physical aperture is A×B, and is defined by the rectangle dimensions, regardless the total number of elements. In switched mode, the basic concept is to transmit only from one Tx element at a time slot and to receive the reflections in all 48 Rx elements. In this example, transmission begins with transmit element 100 at the lower left location in column 110. The Rx elements in rows 101 and 102 receive the reflected signals. To clarify, the order of the transmitting elements in switched mode can be arbitrary.

Figure 1B:
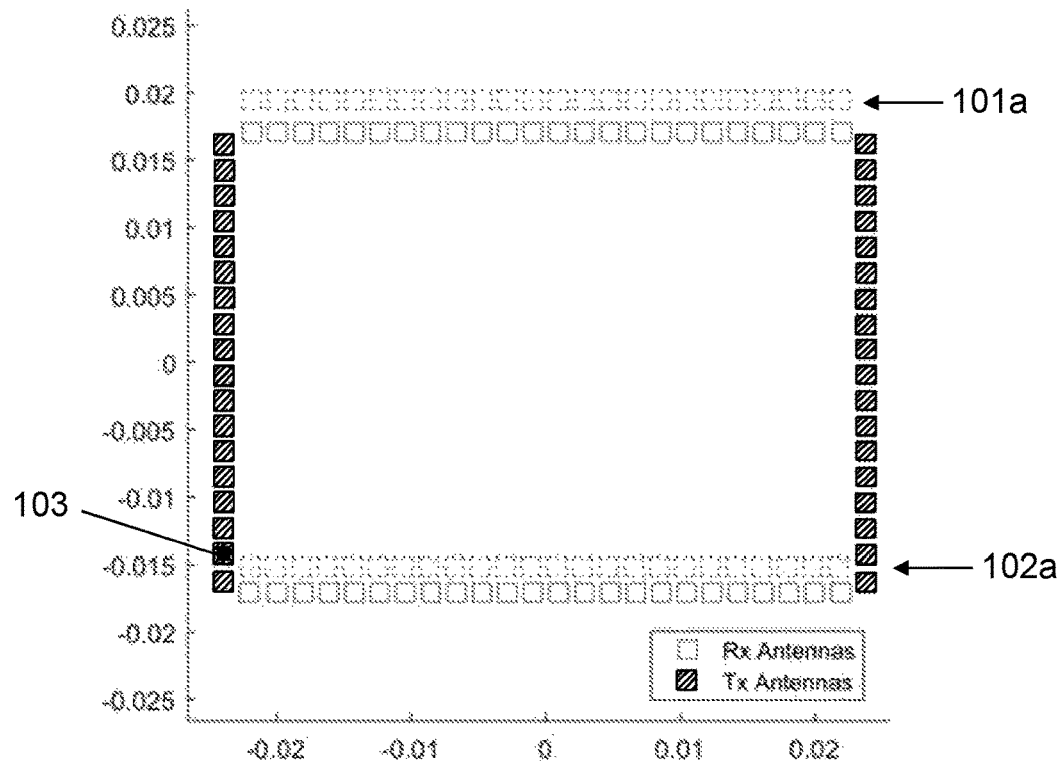

FIG. 1b illustrates how the effective size of the aperture is increased upwardly, without adding more elements. The next transmission is activated from Tx element 103, one location above the lower left location in column 110. This is equivalent to virtually replicating physical rows 101 and 102 one location above, to be virtual rows 101a and 101b. The Rx elements in rows 101a and 102a receive the reflected signals. This process in repeated for all Tx elements in column 110, while each time, an additional replication of physical rows 101 and 102 (which receives the reelected signal) is added, until the areas above row 101 and row 102 are paved with replicated virtual rows. This increases the effective vertical dimension of the aperture rectangle to be 2B (instead of the physical vertical dimension B).

Figure 1C:
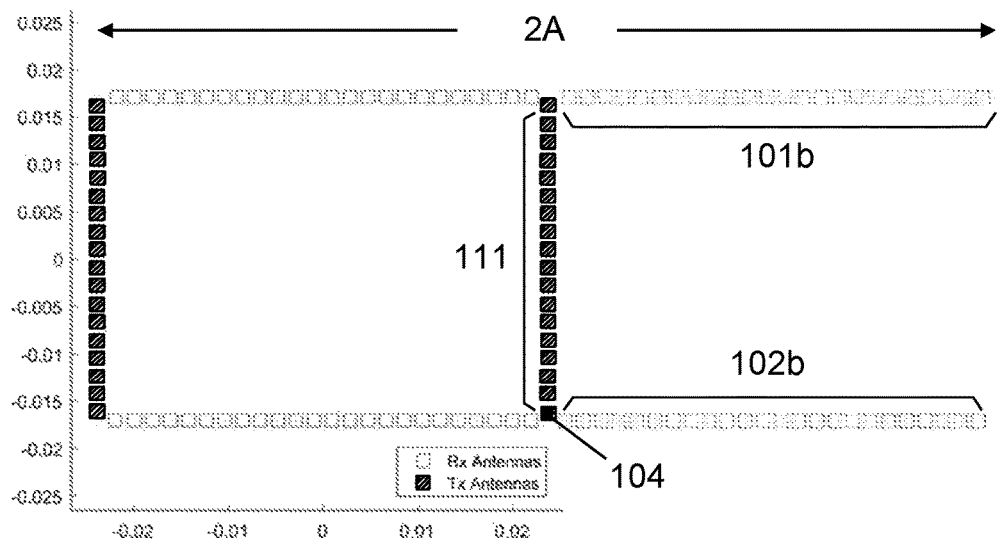

FIG. 1c illustrates how the effective size of the aperture is increased right without adding more elements. The next transmission is activated from Tx element 104, at the lower right location in column 111. This is equivalent to virtually replicating physical rows 101 and 102 full location to the right, to be virtual rows 101b and 102b. The Rx elements in virtual replicated rows 101b and 102b receive the reflected signals.

Figure 1D:
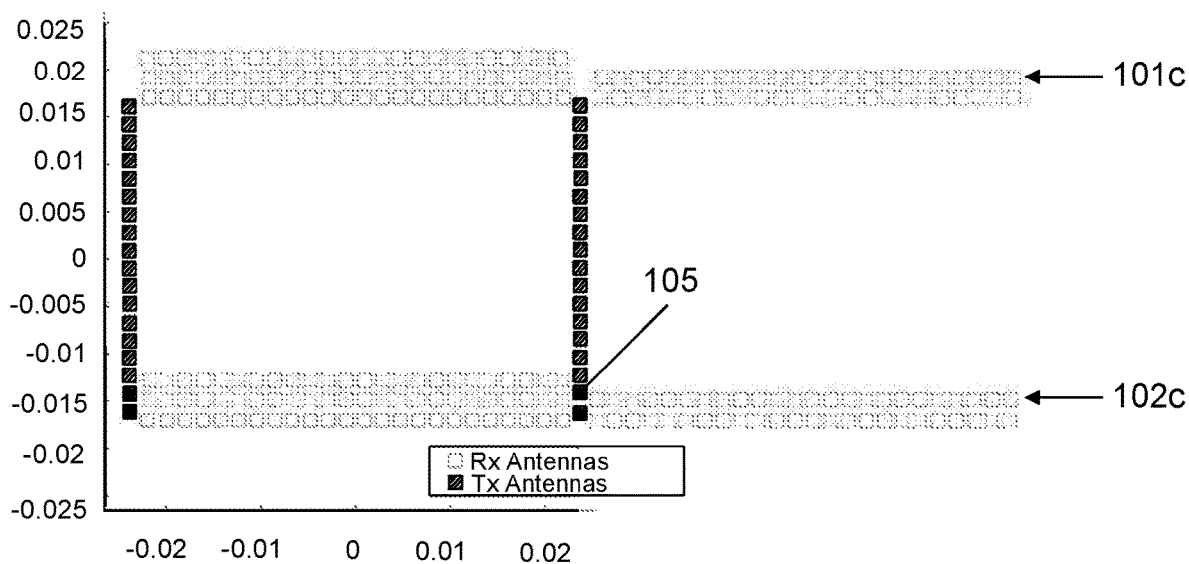

FIG. 1d illustrates how the effective size of the aperture is increased rightwardly, without adding more elements. The next transmission is activated from Tx element 105, one location above the lower right location in column 111. This is equivalent to virtually replicating physical rows 101 and 102 full location to the right and one location above, to be virtual rows 101c and 102c. The Rx elements in rows 101c and 102c receive the reflected signals. This process in repeated for all Tx elements in column 111, while each time, an additional replication of physical rows 101 and 102 (which receives the reelected signal) is added, until the areas above virtual replicated row 101b and row 102b are paved with replicated virtual rows. This increases the effective horizontal dimension of the aperture rectangle to be 2A (instead of the physical horizontal dimension A).

Figure 1E:
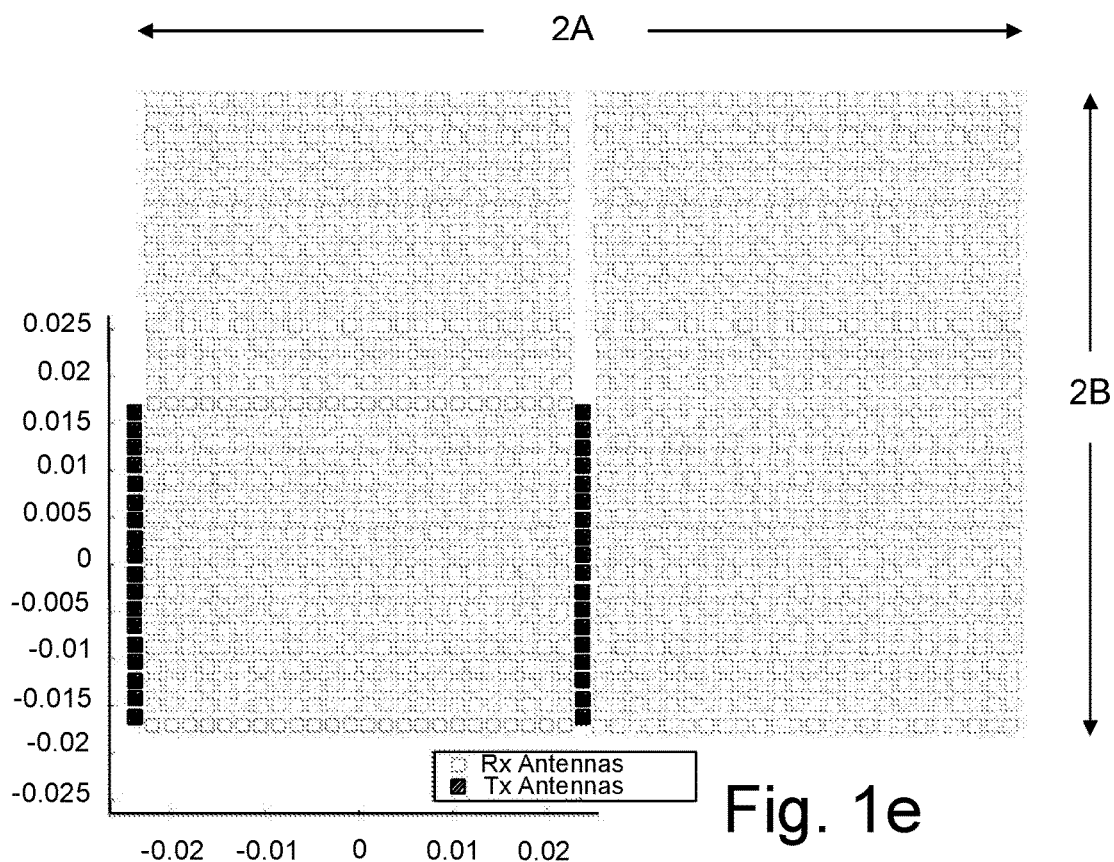
Figure 2:
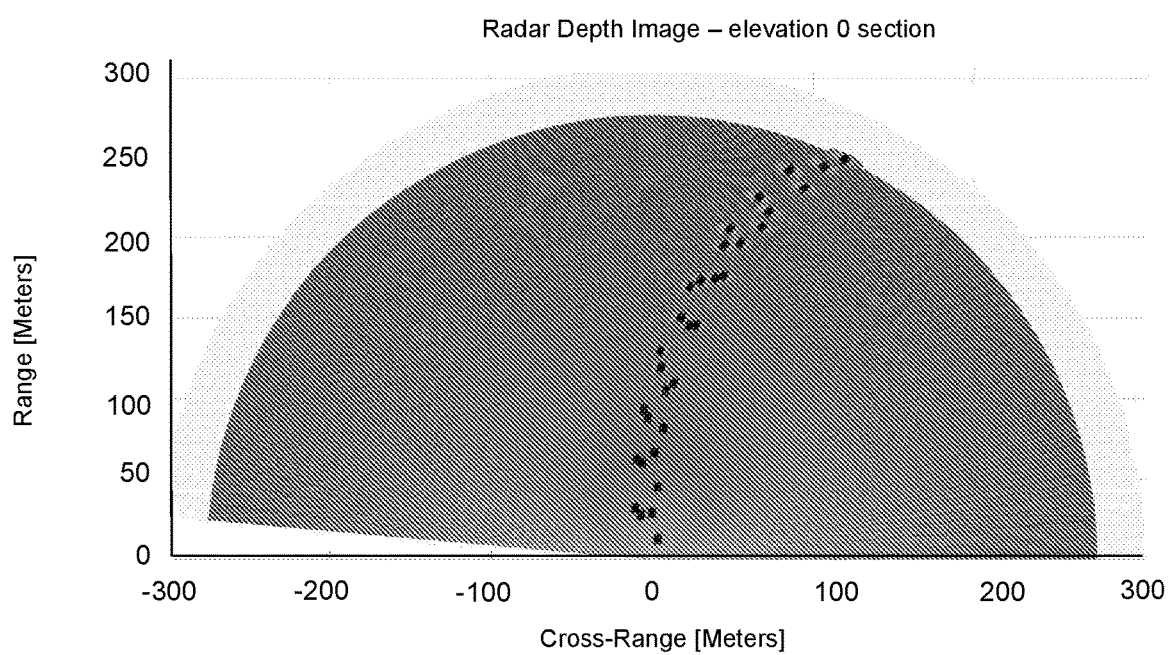
FIG. 2 illustrates a typical output from the DSP from a top down view (a), and from a camera view point.

FIG. 1e illustrates how the effective size of the aperture is increased both upwardly and rightwardly, without adding more elements, as a result of activating all Tx elements, one at a time slot. The resulting equivalent aperture size is 2A×2B, twice the aperture determined by the physical elements (which is A×B). This doubling of the physical aperture works equally well for simultaneously transmitting antennas using orthogonal waveforms.

In a $2^{nd}$ variation of the above array, each of the 2 column is duplicated (N−1) times by a series of shifts of $\lambda/2$ each, for example to the right, thus creating two triplets of columns. Total number of elements in all 6 columns is now 6N. For N=3, total number of Tx elements is 36.

Now the two 72 elements rows are each decimated 3:1 so that each row now has 24 elements with a nominal $3/2\lambda$ spacing, and the total number of elements in both rows is 48.

Transmitting from all 36 elements, whether sequentially all simultaneously, yields an equivalent array of 36×48=1728 elements using only 36 TX and 48 RX array elements.

The two alternatives designs above exemplify how to tradeoff the number of Tx and Rx elements, e.g. from 12 Tx and 144 Rx, to 36 Tx and 49 Rx. This is crucial when adapting a design to available radar transceiver chips to save chip count. The radar front end is based on the ST Microelectronics radar transceiver chip STRADA770, with 4 Rx channels and 3 Tx channels, with an option to connect several of these chips to create larger arrays. In the proposed design 12 of these chips are used, which gives 48 Rx channels and 36 Tx channels, and allows to get a resolution of about 0.9° in azimuth and 2.4° in elevation (@ boresight before windowing), with FOV of 900 in azimuth and 22.5° in elevation, where the array size is about 13×10 cm.

Without derogating the above, it is noted that 'antenna' in this submission is occasionally used as a synonym to an array element. Each array element can be a sub-array of antennas in itself. For example, each of the Tx, or Rx, array elements could be a vertical subarray of antennas by itself.

Signal Processing

The processing unit is based on Xilinx Zynq-7000 series combined microprocessor FPGA SoC. This unit controls the radar front-end and simultaneously process the IF data. In each radar frame we transmit a 100 μs chirp of up to 1 GHz bandwidth from each of the 36 Tx channels, where some of the chirps are increasing in frequency (up chirp) and some decreasing (down chirp). The processing unit get the sampled IF data via parallel bus using an integrated FIFO buffer. Then a 512 point FFT is computed for each Rx-Tx pair. Then we use another 3D FFT on the result (corresponding to velocity, azimuth and elevation dimensions), but in an hierarchical manner, so only bins where there is a reasonable probability of target presence will be processed in the next steps. This approach yields a sparse output from each FFT step to the next which in the average case significantly reduce the amount of processing. Finally, a list of 4-D voxels (range, velocity, azimuth, elevation) is generated with indication to the probability that a target is preset in this voxel. This probability is computed against the noise distribution (null hypothesis) calculated in the negative frequency spectrum which is always composed just from the noise components and never from real targets.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for increasing an effective aperture of a radar switch/multiple input, multiple output (MIMO) antenna array, comprising:
   providing an array of radar uniformly spaced physical receive (Rx) only antenna elements and an array of uniformly spaced physical transmit (Tx) only antenna elements arranged in at least two opposing Rx rows and at least two opposing Tx columns, said array forming a rectangular physical aperture;
   activating a single first arbitrary Tx element from one column, to transmit a radar pulse, and receiving reflections of the first transmission in all Rx elements, thereby virtually replicating said two opposing Rx rows about an origin determined by the location of said first Tx element within said rectangular physical aperture;
   performing the preceding step for all remaining Tx elements individually one by one in arbitrary order thereby virtually replicating said two opposing Rx rows about an origin determined by the location of each activated Tx element within said rectangular physical aperture, while each time, receiving reflections of the transmission from each Tx element by all Rx elements;
   wherein the array of Rx elements is full in azimuth and thin in elevation, and the array of Tx elements is full in elevation and thin in azimuth;
   generating a virtual rectangular aperture having dimensions twice that of said rectangular physical aperture; and
   increasing an effective size of the aperture in all directions.

2. The method according to claim 1, wherein a spacing between the Tx elements in each column is $\lambda/2$, wherein $\lambda$ is a wavelength of the radar pulse emitted by the Tx elements.

3. The method according to claim 1, wherein the spacing between the Rx elements is λ/2 times the number of the Tx elements in each column.

4. The method according to claim 1, further comprising collecting data simultaneously from each Rx element.

5. A radar sensor, comprising: an array of uniformly spaced physical receive (Rx) only antenna elements and of uniformly spaced physical transmit (Tx) only antenna elements, arranged in at least two opposing Rx rows and at least two opposing Tx columns, said array forming a rectangular physical aperture;
a processor adapted to:
activate a single first arbitrary Tx element from one column, to transmit a radar pulse and receive reflections of the first transmission in all Rx elements, thereby virtually replicating said two opposing Rx rows about an origin determined by the location of said first Tx element within said rectangular physical aperture;
perform the preceding step for all remaining Tx elements individually one by one in arbitrary order, thereby virtually replicating said two opposing Rx rows about an origin determined by the location of each activated Tx element within said rectangular physical aperture, while receiving reflections of the transmission from each Tx element by all Rx elements;
wherein the array of Rx elements is full in azimuth and thin in elevation, and the array of Tx elements is full in elevation and thin in azimuth;
wherein the processor effectively generates a virtual rectangular aperture having dimensions twice that of said rectangular physical aperture; and
wherein an effective size of the aperture is increased in all directions.

6. The radar sensor according to claim 5, wherein a frequency of the radar pulse emitted by the Tx elements is at least 77 GHz.

7. The radar sensor according to claim 5, wherein the Rx rows are "full" in an azimuth direction and the Tx columns are "thin" in the azimuth direction.

8. The radar sensor according to claim 5, comprising parallel rows which are "full" in azimuth and parallel columns which are "thin" in azimuth.

9. The radar sensor according to claim 5, wherein the Rx rows are "thin" in an elevation direction and the Tx columns are "full" in the elevation direction.

10. The radar sensor according to claim 5, in which the effective size of the aperture is increased in all directions, by activating all Tx elements, one in each time slot.

11. The method according to claim 1, wherein, during said steps of activating and performing, b) and c) the Tx elements are transmitting sequentially in different time slots.

12. The radar sensor according to claim 5, wherein the processor is adapted to activate the first Tx element during a first time slot and to activate the remaining Tx elements during different time slots.

13. The radar sensor according to claim 5, wherein the processor is adapted to activate all the Tx elements simultaneously using different pulse waveforms separable in a receiver or using orthogonal waveforms.

14. A multiple input, multiple output (MIMO) based radar sensor, comprising: a first plurality of transmit (Tx) only elements uniformly spaced and arranged in a first column and a second column, said second column spaced a first distance from said first column; a second plurality of receive (Rx) only elements uniformly spaced
and arranged in a first row and a second row, said second row spaced a second distance from said first row;
wherein said first column and second column and said first row and said second row form a rectangular physical antenna array (A, B);
a controller operative to transmit from a single Tx element in each time slot and receive reflections in all Rx elements resulting in a virtual rectangular antenna array having dimensions twice that of said rectangular physical antenna array; and
wherein said Tx elements are selected for transmission in arbitrary order.

15. The radar sensor according to claim 14, wherein a spacing between the Tx elements in each column is λ/2, wherein λ is a wavelength of the radar pulse emitted by the Tx elements.

16. The radar sensor according to claim 14, wherein the spacing between the Rx elements is λ/2 times the number of the Tx elements in each column.

17. The radar sensor according to claim 14, in which the effective size of the aperture is increased in all directions, by activating all Tx elements individually one by one in each time slot.

18. The radar sensor according to claim 14, wherein a frequency of a radar pulse emitted by the Tx elements is at least 77 GHz.

* * * * *